United States Patent
Zhong et al.

(10) Patent No.: US 11,288,489 B2
(45) Date of Patent: Mar. 29, 2022

(54) FINGERPRINT IDENTIFICATION METHOD, ELECTRONIC DEVICE AND DISPLAY PANEL

(71) Applicant: WUHAN CHINA STAR OPTOELECTRONICS TECHNOLOGY CO., LTD., Hubei (CN)

(72) Inventors: Li Zhong, Hubei (CN); Guowei Zha, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 200 days.

(21) Appl. No.: 16/626,575

(22) PCT Filed: Sep. 6, 2019

(86) PCT No.: PCT/CN2019/104697
§ 371 (c)(1),
(2) Date: Dec. 26, 2019

(87) PCT Pub. No.: WO2020/237897
PCT Pub. Date: Dec. 3, 2020

(65) Prior Publication Data
US 2021/0334511 A1 Oct. 28, 2021

(30) Foreign Application Priority Data
May 31, 2019 (CN) .................. 201910473067.X

(51) Int. Cl.
*G06K 9/00* (2006.01)
*G06F 3/044* (2006.01)
*G06F 3/041* (2006.01)

(52) U.S. Cl.
CPC ....... *G06K 9/00087* (2013.01); *G06F 3/0412* (2013.01); *G06F 3/0446* (2019.05); *G06F 3/04164* (2019.05); *G06K 9/0002* (2013.01)

(58) Field of Classification Search
None
See application file for complete search history.

(56) References Cited

U.S. PATENT DOCUMENTS 10,229,305 B2  3/2019  Zhu
10,331,939 B2  6/2019  He et al.
(Continued)

FOREIGN PATENT DOCUMENTS

CN  104932753 A  9/2015
CN  107623020 A  1/2018
(Continued)

*Primary Examiner* — Nicholas J Lee
(74) *Attorney, Agent, or Firm* — Soroker Agmon Nordman

(57) ABSTRACT

The present invention provides a fingerprint identification method, an electronic device and a display panel. The method includes: acquiring a center position information of a geometric center position of the touch operation getting a touch information of the touch operation; determining whether the center position information is the same as the geometric center position of one of the fingerprint identification arrays; getting a fingerprint image data according to a judgment result and the touch information; and unlocking the screen when the fingerprint image data is consistent with a preset fingerprint data.

18 Claims, 3 Drawing Sheets

(56) References Cited

U.S. PATENT DOCUMENTS

| | | | |
|---|---|---|---|
| 10,713,460 B2 | 7/2020 | Zhang et al. | |
| 2018/0211080 A1* | 7/2018 | He | G06K 9/00087 |
| 2019/0227652 A1 | 7/2019 | Kwon | |
| 2020/0218388 A1 | 7/2020 | Wu et al. | |
| 2020/0364439 A1* | 11/2020 | Hu | G06K 9/00013 |

FOREIGN PATENT DOCUMENTS

| | | |
|---|---|---|
| CN | 108921112 A | 11/2018 |
| CN | 109410887 A | 3/2019 |
| CN | 109643186 A | 4/2019 |
| CN | 109726618 A | 5/2019 |
| CN | 109791609 A | 5/2019 |

* cited by examiner

FINGERPRINT IDENTIFICATION METHOD, ELECTRONIC DEVICE AND DISPLAY PANEL

BACKGROUND OF THE INVENTION

1. Field of the Invention

The present invention relates to a display technical field, and more particularly to a fingerprint identification method, an electronic device and a display panel.

2. Description of the Prior Art

With the continuous development of full screens, the technology of under-screen fingerprint identification has emerged as the times require. The existing under-screen fingerprint identification technology can only achieve fingerprint unlocking at a fixed position in the screen, but the technology of under-screen fingerprint identification with larger unlocking area does not require fingerprint unlocking in a fixed position, it can unlock fingerprints in the half or the whole screen. Namely, it can unlock larger areas (such as a half-screen, a full-screen or several fingerprint contact areas). The technology of under-screen fingerprint identification with larger unlocking area becomes a trend of development, making users more free and convenient to use, and improving user experience.

However, when the fingerprint unlockable area increases, the number of fingerprint sensors will increase, which leads to an increase in the number of channels (i.e., connections with driver chips). Thus, the prior art can lead to the increase of the display module's border, which is not conducive to the design of the narrow border.

Hence, it is necessary to provide a fingerprint identification method, an electronic device and a display panel to solve the problems existing in the prior art.

BRIEF SUMMARY OF THE INVENTION

One object of the present invention is to provide a fingerprint identification method, an electronic device and a display panel, which can reduce the number of channels and a border size of a display module.

To solve the above technical problems, the present invention provides a fingerprint identification method, wherein a display module includes:

a screen;

a fingerprint identification module, being corresponding to the screen and including a fingerprint sensing array; the fingerprint sensing array being composed of multi-row and multi-column fingerprint identification arrays; each fingerprint identification array being composed of multi-row and multi-column fingerprint identification units; wherein output terminals of the fingerprint identification units of the same column in each row of the fingerprint identification arrays are electrically connected to form multiple testing channels; and a driving chip, being electrically connected to the fingerprint identification module;

the fingerprint identification method includes following steps of:

detecting a touch operation of a user on the screen when the screen is in a locked state, and acquiring a geometric center position of the touch operation, and obtaining a center position information;

getting a touch information of the touch operation;

determining whether the center position information is the same as the geometric center position of one of the fingerprint identification arrays and obtaining a judgment result;

getting a fingerprint image data according to the judgment result and the touch information; and unlocking the screen when the fingerprint image data is consistent with a preset fingerprint data.

The present invention further provides an electronic device, including a memory and a controller, the memory being used for storing instructions, and the controller being used for executing the instructions to achieve above fingerprint identification method The present invention further provides a display panel, including a fingerprint identification module, which includes: a fingerprint sensing array.

The fingerprint sensing array is composed of multi-row and multi-column fingerprint identification arrays. Each fingerprint identification array is composed of multi-row and multi-column fingerprint identification units. Wherein output terminals of the fingerprint identification units of the same column in each row of the fingerprint identification arrays are electrically connected to form multiple testing channels.

In the fingerprint identification method, the electronic device and the display panel of the present invention, the output terminals of the fingerprint identification units of the same column in each row of the fingerprint identification arrays are electrically connected, for reducing the number of channels and further reducing the border size of the display module.

BRIEF DESCRIPTION OF THE DRAWINGS

For more clearly illustrating the technical scheme in the embodiment of the present application or the prior art, the following text will briefly introduce the accompanying drawings used in the embodiment or the prior art. It is obvious that the accompanying drawings in the following description are only some embodiments of the present application. For the technical personnel of the field, other drawings can also be obtained from these drawings without paying creative work.

DETAILED DESCRIPTION OF THE PREFERRED EMBODIMENTS

The following embodiments are illustrated with reference to the accompanying drawings to illustrate specific embodiments of the present invention that can be implemented. Directional terms mentioned in the present invention, such as "top", "bottom", "front", "back", "left", "right", "inside", "outside", "side" etc., are only used with reference to the orientation of the accompanying drawings. Therefore, the used directional terms are intended to illustrate, but not to limit, the present invention. In the figures, units with similar structures are represented by the same label.

Figure 1:
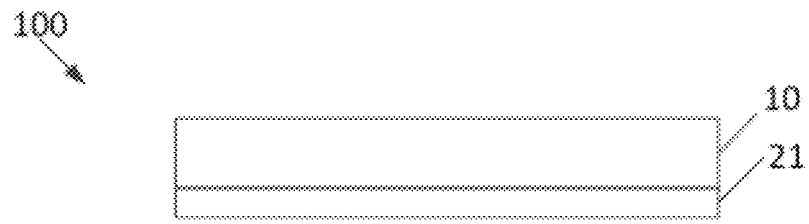
FIG. 1 is a structure schematic view of a display module of the present invention.
Figure 2:
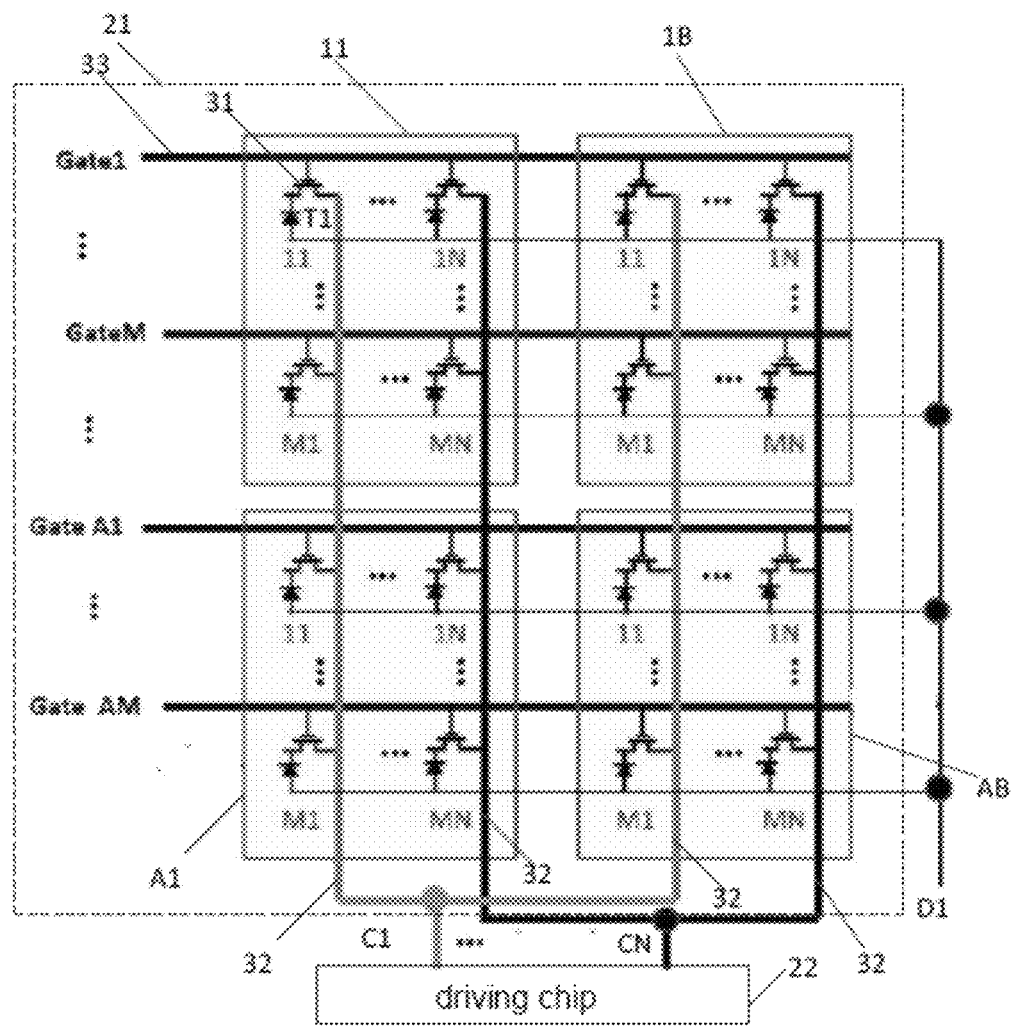
FIG. 2 is a structure schematic view of a fingerprint identification module of a first embodiment of the present invention.
Figure 3:
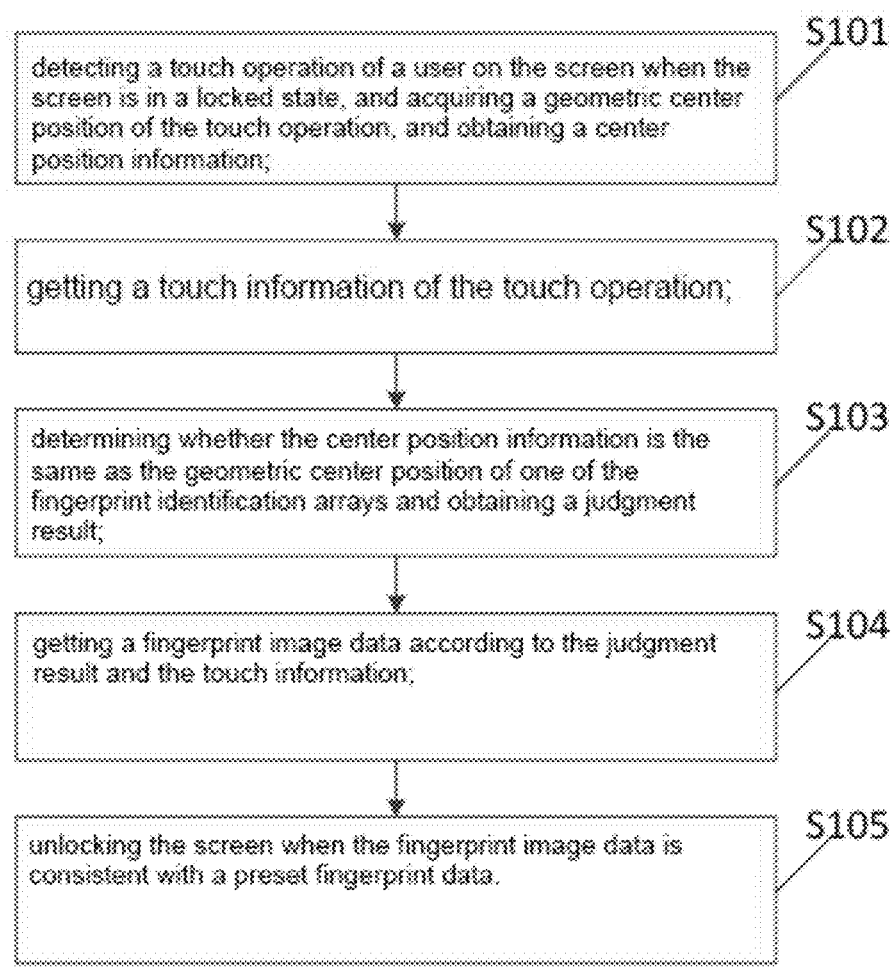
FIG. 3 is a flow chart of a fingerprint identification method of the present invention.

Please refer to FIGS. 1 to 3, FIG. 1 is a structure schematic view of a display module of the present invention.

Referring to FIGS. 1 and 2, the display module 100 in a first embodiment includes a screen 10, a fingerprint identification module 21 and a driving chip 22. The screen 10 may include a display screen and a touch screen. The fingerprint identification module 21 is corresponding to the screen 10. In one embodiment, the fingerprint identification module 21 is located under the screen 10. Of course understandable, the fingerprint identification module 21 may be embedded into the screen 10. Namely, the position relationship between the fingerprint identification module 21 and the screen 10 does not limit the present invention.

Referring to FIG. 2, the fingerprint identification module 21 includes a fingerprint sensing array, which is composed of multi-row and multi-column fingerprint identification arrays. That is, the fingerprint sensing array includes A*B fingerprint identification arrays 11 to AB. Namely, the fingerprint sensing array includes A rows and B columns of the fingerprint identification arrays. In FIG. 2, the numbers of the fingerprint identification arrays are 11, 1B, A1 and AB, respectively. Each fingerprint identification array is composed of multi-row and multi-column fingerprint identification units 31. Wherein, output terminals of the fingerprint identification units 31 of the same column in each row of the fingerprint identification arrays are electrically connected.

That is, each fingerprint identification array includes M*N fingerprint identification units. Wherein, the output terminals of the fingerprint identification units 31 of the same column in the same row of the fingerprint identification arrays are electrically connected to form multiple testing channels C1-CN. Each fingerprint identification unit 31 includes a switch element T1 and a fingerprint sensor. The switch element T1 is used to control whether a signal of the fingerprint sensor is read. The switch element T1 includes an output terminal, which is connected with a vertical driving line 32. The vertical driving lines 32 of the same column in each row of the fingerprint identification arrays are electrically connected. Wherein, input terminals of the switch element T1 and the fingerprint sensor are connected to a signal line DI, and a control terminal of the switch element T1 is connected to a horizontal driving line 33.

The driving chip 22 is electrically connected with the fingerprint identification module 21. Each testing channel of the driving chip 22 is used to acquire the sum of signals of the fingerprint identification units 31 of the same column in each row of the fingerprint identification arrays. In the embodiment, the driving chip 22 is used to drive the fingerprint identification module 21. Please see the description below for details.

A fingerprint identification method includes following steps.

A step S101 is detecting a touch operation of a user on the screen when the screen is in a locked state, and acquiring a geometric center position of the touch operation, and obtaining a center position information.

For example, referring to FIG. 3, in one embodiment, when the screen is in the locked state, the touch operation of the user on the screen is detected, and the center position of a contact point between a finger and the screen can be determined through at least one positioning technology of a pressure touch, a resistance touch, a capacitance touch and an infrared touch, and the center position information can be obtained. Of course, the positioning technology is not limited to the above ways.

A step S102 is getting a touch information of the touch operation.

For example, the touch information includes a fingerprint information and a coordinate information, wherein the fingerprint information and the coordinate information are related.

Before the step S102, the method further includes: a step S101' and a step S102'.

The step S101' is generating a fingerprint signal by a touch identification unit when the touch operation of the user on the screen is detected. Wherein, the touch identification unit is the fingerprint identification unit corresponding to the touch operation.

The step S102' is recording the fingerprint signal and coordinates of the touch identification unit by the driving chip and obtaining the fingerprint information and the coordinate information respectively.

For example, when the user touches the screen, the fingerprint identification module 21 gets the touch information. The fingerprint identification module 21 performs time-sharing row scanning, and each channel reads the sum of touch signals of the fingerprint identification units of the same column. Gate1 to GateAM denote the horizontal drive lines accessed by the control terminals of the fingerprint identification units located in the same row, respectively. Understandably, in the embodiment, the number of control channels is the same as the number of the horizontal driving lines.

For example, when Gate1 performs row scanning, C1 (a first channel) is responsible for reading the sum of touch signals of the fingerprint identification unit (coordinate 11) in the first row and the first column, namely the sum of B touch signals. Suppose that a dark current of each fingerprint identification unit is I0, (I0 is the sum of a dark current of the switch element and a dark current of the fingerprint sensor), the sum of the dark currents read by C1 is I, wherein I=I0*B. If one of the fingerprint identification units is touched, the fingerprint signal I11 is generated and is superimposed on the dark current I to form the sum of the signals of one channel. At this time, the driving chip 22 records the fingerprint signal I11 and the coordinate 11. If all the identical coordinates of the fingerprint identification unit 31 are not touched, the sum of the dark currents read by C1 is I, wherein I=I0*B, so there is no fingerprint information, the driving chip 22 does not need to record. The signal recording method for other channels is the same.

A step S103 is determining whether the center position information is the same as the geometric center position of one of the fingerprint identification arrays and obtaining a judgment result.

For example, it needs to judge or determine whether the geometric center position of the touch operation is the same as that of one fingerprint identification array and obtain the judgment result.

A step S104 is getting a fingerprint image data according to the judgment result and the touch information.

This step may include a step S1041 and a step S1042.

The step S1041 is that if the center position information is the same as the geometric center position of one of the fingerprint identification arrays, it can determine the corresponding fingerprint identification array according to the center position information, to obtain a positioned identification array and can get the fingerprint image data according to the touch information and coordinates of the positioned identification array.

For example, if the geometric center position of the touch operation is the same as that of one fingerprint identification array, it indicates that the finger is pressed onto the fingerprint identification array. Therefore, the fingerprint identification array, which the touch operation is applied to, can be determined according to the geometric center position of the touch operation. For example, if the geometric center position of the touch operation is the same as that of the array A1, the array A1 is used as the positioned identification array. The touch information includes a coordinate information and a fingerprint information, wherein the fingerprint information and the coordinate information are related. In one embodiment, the fingerprint information corresponding to the coordinate information is mapped into the coordinates of the positioned identification array A1, and the fingerprint image data is obtained.

The step of getting the fingerprint image data according to the touch information and coordinates of the positioned identification array includes a step S301 and a step S302 in one embodiment.

The step S301 is mapping the coordinate information into the coordinates of the positioned identification array.

The step S302 is correlating the coordinates of the positioned identification array with the fingerprint information to obtain the fingerprint image data.

For example, the coordinate information obtained by the driving chip is mapped into the coordinates of the positioned identification array A1, and then the coordinates of the positioned identification array A1 is correlated with the fingerprint information to obtain the fingerprint image data.

Specifically, the fingerprint information corresponding to each coordinate of the driving chip may be directly mapped into the coordinates of the positioned identification array A1.

The step S1042 is that if the center position information is different from the geometric center position of any one of the fingerprint identification arrays, it can determine position coordinates of the fingerprint identification array according to the center position information, and obtain the fingerprint image data according to the position coordinates, a presupposed coordinate mapping relation and the touch information.

The presupposed coordinate mapping relation is a coordinate mapping relation between multiple fingerprint identification arrays.

For example, if the geometric center position of the touch operation is different from that of any one of the fingerprint identification arrays, the finger is pressed onto at least two fingerprint identification arrays. Therefore, it can determine which of the fingerprint identification arrays the geometric center position is located on, according to the geometric center position of the touch operation. Specifically, if the geometric center position of the touch operation is detected to belong to the array 1B, the coordinates of the array 1B are obtained.

For example, the fingerprint image data can be obtained according to the coordinates of the array 1B, the presupposed coordinate mapping relation and the touch information.

In one embodiment, the fingerprint information recorded by the driving chip 22 can be mapped into the corresponding coordinates of the different fingerprint identification arrays according to a corresponding relationship between the coordinates of the array 1B and the coordinates of other fingerprint identification arrays around it, so that the fingerprint information can be stitched into a complete fingerprint information.

A step S105 is unlocking the screen when the fingerprint image data is consistent with a preset fingerprint data.

For example, in one embodiment, the fingerprint identification (or verification) is performed on the base of fingerprint signal pretreatment, feature extraction and verification algorithm module. When the fingerprint image data is consistent with the preset fingerprint data, the screen is unlocked.

Understandably, if the fingerprint image data is inconsistent with the preset fingerprint data, the screen is not unlocked.

Because the output terminals of the fingerprint identification units of the same column in each row of the fingerprint identification arrays are electrically connected, the number of channels in a vertical direction is reduced, and the border size of the display module is reduced.

Figure 4:
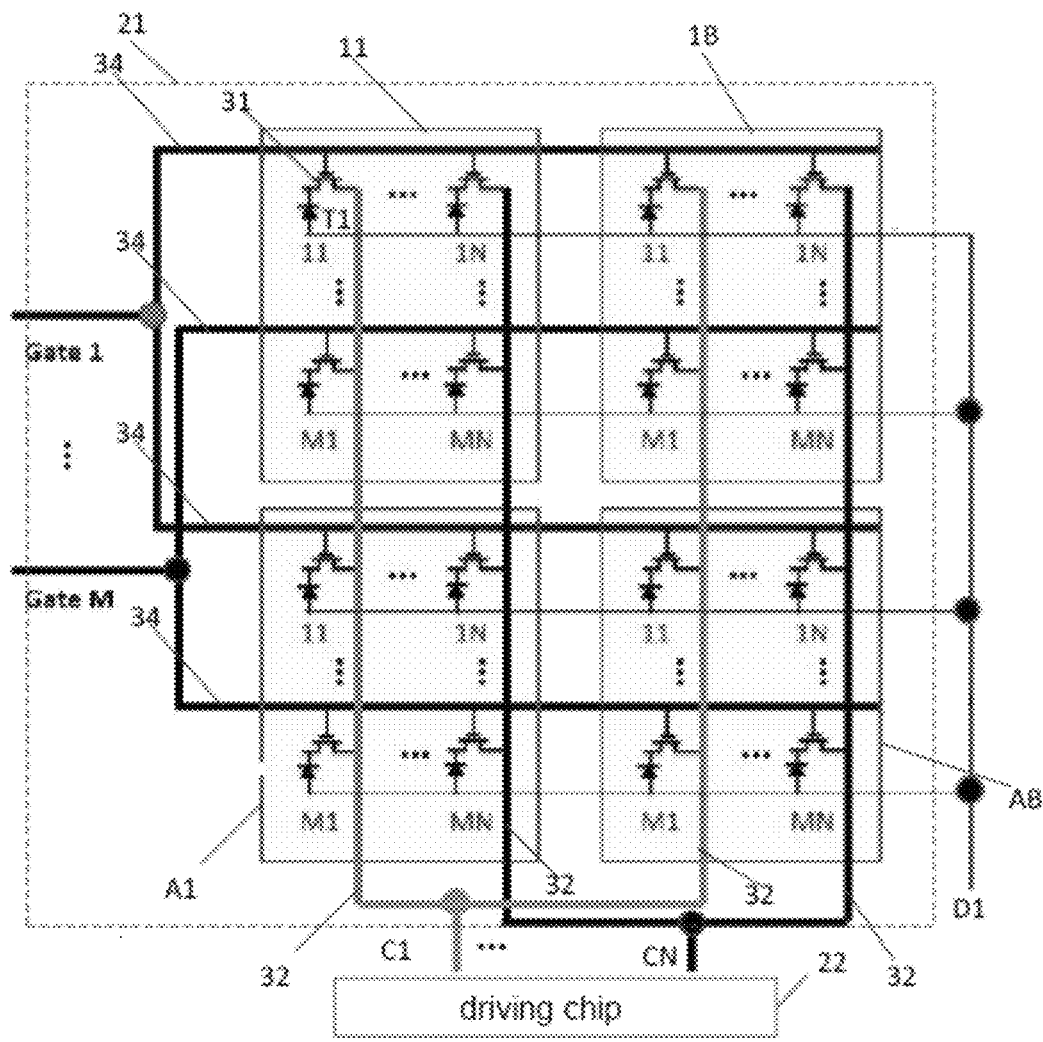
FIG. 4 is a structure schematic view of the fingerprint identification module of a second embodiment of the present invention.

Please refer to FIG. 4, FIG. 4 is a structure schematic view of the fingerprint identification module of a second embodiment of the present invention.

The difference between the second embodiment and the previous embodiment is that, the control terminals of the fingerprint identification units of the same row in multiple rows of the fingerprint identification arrays are also electrically connected to form multiple control channels Gate1 to GateM in the second embodiment, for further reducing the number of channels in a horizontal direction and further reducing the border size of the display module.

Wherein, the control terminal of the switch element T1 is connected to a horizontal driving line 34. In multiple rows of the fingerprint identification arrays, the horizontal driving lines 34 of the switch elements T1 of the same row are electrically connected.

Wherein each testing channel of the driving chip 22 is used to acquire the sum of signals of the fingerprint identification units 31 of the same column and the same row in multiple rows of the fingerprint identification arrays.

For example, when Gate1 performs row scanning, C1 reads the sum of touch signals of all the fingerprint identification unit (coordinate 11), namely the sum of A*B touch signals. Suppose that the dark current of each fingerprint identification unit is I0, (I0 is the sum of a dark current of the TFT and a dark current of the fingerprint sensor), the sum of the dark currents read by C1 is I, wherein I=I0*A*B. If one of the fingerprint identification units is touched, the fingerprint signal I11 is generated and is superimposed on the dark current I to form the sum of the signals of one channel. At this time, the driving chip 22 records the fingerprint signal I11 and the coordinate 11. If all the identical coordinates of the fingerprint identification unit 31 are not touched, the sum of the dark currents read by C1 is I, wherein I=I0*A*B, so there is no fingerprint information, the driving chip 22 does not need to record. The signal recording method for other channels is the same.

It is understood that the second embodiment may adopt the same fingerprint identification method as the first embodiment, so it will not be repeated here.

Figure 5:
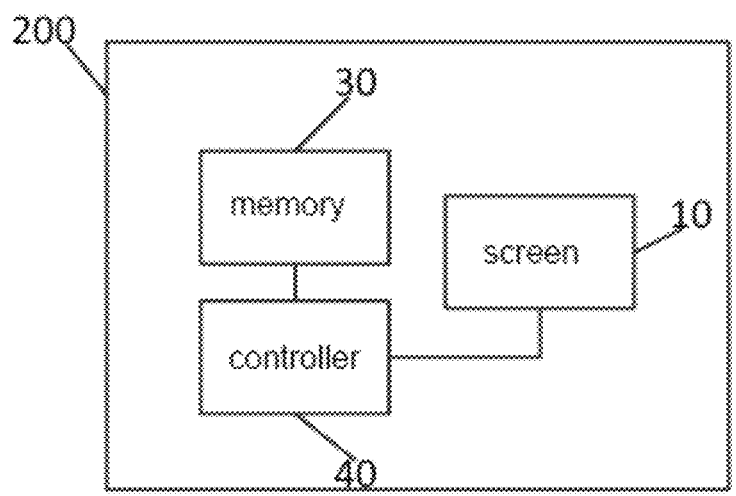
FIG. 5 is a structure schematic view of an electronic device of the present invention.

The present invention provides an electronic device 200, as shown in FIG. 5, which includes a memory 30 and a controller 40. The memory 30 is used for storing instructions, and the controller 40 is used for executing the instructions to achieve the fingerprint identification method described above. The electronic device can also include the screen 10 and driving components.

The present invention further provides a display panel, which includes the fingerprint identification module. The fingerprint identification module can be any of the fingerprint identification modules in FIG. 2 or FIG. 4. The specific structure is referred to above text and will not be described here.

In the fingerprint identification method, the electronic device and the display panel of the present invention, the output terminals of the fingerprint identification units of the same column in each row of the fingerprint identification arrays are electrically connected, so the number of channels is reduced, and the border size of the display module is reduced.

In summary, although the present invention has been disclosed in the preferred embodiments as described above, the preferred embodiments mentioned above are not intended to limit the invention. The ordinary technicians in the field can make various modifications and embellishments without departing from the spirit and scope of the present invention, so the scope of protection of the present invention is based on the scope defined by the claims.

What is claimed is:

1. A fingerprint identification method, wherein a display module includes:
   a screen;
   a fingerprint identification module, being corresponding to the screen and including a fingerprint sensing array; the fingerprint sensing array being composed of multi-row and multi-column fingerprint identification arrays; each fingerprint identification array being composed of multi-row and multi-column fingerprint identification units; wherein output terminals of the fingerprint identification units of the same column in each row of the fingerprint identification arrays are electrically connected to form multiple testing channels; and
   a driving chip, being electrically connected to the fingerprint identification module;
   the fingerprint identification method including following steps of:
   detecting a touch operation of a. user on the screen when the screen is in a locked state, and acquiring a geometric center position of the touch operation, and obtaining a center position information;
   getting a touch information of the touch operation;
   determining whether the center position information is the same as the geometric center position of one of the fingerprint identification arrays and obtaining a judgment result;
   getting a fingerprint image data according to the judgment result and the touch information; and
   unlocking the screen when the fingerprint in age data is consistent with a preset fingerprint data.

2. The fingerprint identification method as claimed in claim 1, wherein the step of getting a fingerprint image data according to the judgment result and the touch information includes:
   if the center position information is, the same as the geometric center position of one of the fingerprint identification arrays, determining the corresponding fingerprint identification array according to the center position information to obtain a positioned identification array; and getting the fingerprint image data according to the touch information and coordinates of the positioned identification array; and
   if the center position information is different from the geometric center position of any one of the fingerprint identification arrays, determining position coordinates of the fingerprint identification array according to the center position information, and obtaining the fingerprint image data according to the position coordinates, a presupposed coordinate mapping relation and ale touch information.

3. The fingerprint identification method as claimed in claim 2, wherein the touch information includes a fingerprint information and a coordinate information, and the fingerprint information and the coordinate information are related; and the step of getting the fingerprint image data according to the touch information and coordinates of the positioned identification array includes:
   mapping the coordinate information into the coordinates of the positioned identification array; and
   correlating the coordinates of the positioned identification array with the fingerprint information to obtain the fingerprint image data.

4. The fingerprint identification method as claimed in claim 3, wherein before the step of getting a touch information of the touch operation, the method includes:
   generating a fingerprint signal by a touch identification unit when the touch operation of the user on the screen is detected, wherein the touch identification unit is the fingerprint identification unit corresponding to the touch operation; and
   recording the fingerprint signal and coordinates of the touch identification unit by the driving chip and obtaining the fingerprint information and the coordinate information respectively.

5. The fingerprint identification method as claimed in claim 1, wherein control terminals of the fingerprint identification units of the same row in multiple rows of the fingerprint identification arrays are electrically connected to form multiple control channels.

6. The fingerprint identification method as claimed in claim 5, wherein each fingerprint identification unit includes a switch element and a fingerprint sensor; the switch element includes a control terminal, which is connected to a horizontal driving line; and in multiple rows of the fingerprint identification arrays, the horizontal driving lines of the switch elements of the same row are electrically connected.

7. The fingerprint identification method as claimed in claim 5, wherein each testing channel of the driving chip can acquire the sum of signals of the fingerprint identification units of the same column and the same row in. multiple rows of the fingerprint identification arrays.

8. The fingerprint identification method as claimed in claim 1, wherein each fingerprint identification unit includes a switch element and a fingerprint sensor; the switch element is used to control the opening and closing of the fingerprint sensor; the switch element includes an output terminal which is connected to a vertical driving line; and the vertical driving lines of the same column in each row of the fingerprint identification arrays are electrically connected.

9. The fingerprint identification method as claimed in claim 1, wherein each testing channel of the driving chip can acquire the sum of signals of the fingerprint identification units of the same column in each row of the fingerprint identification arrays.

10. An electronic device, including a memory and a controller, the memory being used for storing instructions, and the controller being used for executing the instructions to achieve a fingerprint identification method; wherein a display module includes:
    at screen;
    a fingerprint identification module, being corresponding to the screen and including a fingerprint sensing array;

the fingerprint sensing array being composed of multi-row and multi-column fingerprint identification arrays; each fingerprint identification array being composed of multi-row and multi-column fingerprint identification units: wherein output terminals of the fingerprint identification units of the same column in each row of the fingerprint identification arrays are electrically connected to form multiple testing channels; and a driving chip, being electrically connected to the fingerprint identification module;

the fingerprint identification method including following steps of:

detecting a touch operation of a user on the screen when the screen is in a locked state, and acquiring a geometric center position of the touch operation, and obtaining a center position information;

getting a touch information of the touch operation;

determining whether the center position information is the same as the geometric center position of one of the fingerprint identification arrays and obtaining a judgment result;

getting a fingerprint image data according to the judgment result and the touch information; and unlocking the screen when the fingerprint image data is consistent with a preset fingerprint data.

11. The electronic device as claimed in claim 10, wherein the step of getting a fingerprint image data according to the judgment result and the touch information includes:

if the center position information is the same as the geometric center position of one of the fingerprint identification arrays, determining the corresponding fingerprint identification array according to the center position information to obtain a positioned identification array; and getting the fingerprint image data according to the touch information and coordinates of the positioned identification array; and if the center position information is different from the geometric center position of any one of the fingerprint identification arrays, determining position coordinates of the fingerprint identification array according to the center position information, and obtaining the fingerprint image data according to the position coordinates, a presupposed coordinate mapping relation and the touch information.

12. The electronic device as claimed in claim 11, wherein the touch information includes a fingerprint information and a coordinate information, and the fingerprint information and the coordinate information are related; and the step of getting the fingerprint image data according to, the touch information and coordinates of the positioned identification array includes:

mapping the coordinate information into the coordinates of the positioned identification array; and correlating the coordinates of the positioned identification array with the fingerprint information to obtain the fingerprint image data.

13. The electronic device as claimed in claim 12, wherein before the step of getting a touch information of the touch operation, the method includes:

generating a fingerprint, signal by a touch identification unit when the touch operation of the user on the screen is detected, wherein the touch identification unit is the fingerprint identification unit corresponding to the touch operation; and recording the fingerprint signal and coordinates of the touch identification unit by the driving chip and obtaining the fingerprint information and the coordinate information respectively.

14. The electronic device as claimed in claim 10, wherein control terminals of the fingerprint identification units of the same row in multiple rows of the fingerprint identification arrays are electrically connected to form multiple control channels.

15. The electronic device as claimed in claim 14, wherein each fingerprint identification unit includes a switch element and a fingerprint sensor; the switch element includes a control terminal, which is connected to a horizontal driving line; and in multiple rows of the fingerprint identification arrays, the horizontal driving lines of the switch elements of the same row are electrically connected.

16. The electronic device as claimed in claim 14, wherein each testing channel of the driving chip can acquire the sum of signals of the fingerprint identification units of the same column and the same row in multiple rows of the fingerprint identification arrays.

17. The electronic device as claimed in claim 10, wherein each fingerprint identification unit includes a switch element and a fingerprint sensor; the switch element is used to control the opening and closing of the fingerprint sensor; the switch element includes an output terminal, which is connected to a vertical driving line; and the vertical driving lines of the same column in each row of the fingerprint identification arrays are electrically connected.

18. The electronic device as claimed in claim 10, wherein each testing channel of the driving chip can acquire the sum of signals of the fingerprint identification units of the same column in each row of the fingerprint identification arrays.

* * * * *